(12) United States Patent
Wang (10) Patent No.: US 9,174,695 B1
(45) Date of Patent: Nov. 3, 2015

(54) HEAD PARTS ASSEMBLY FOR A BICYCLE WITH A CABLE COLLECTING DEVICE

(71) Applicant: NECO TECHNOLOGY INDUSTRY CO., LTD., Taichung (TW)

(72) Inventor: Yu-Hsin Wang, Taichung (TW)

(73) Assignee: NECO TECHNOLOGY INDUSTRY CO., LTD., Taichung (TW)

( * ) Notice: Subject to any disclaimer, the term of this patent is extended or adjusted under 35 U.S.C. 154(b) by 0 days.

(21) Appl. No.: 14/328,108

(22) Filed: Jul. 10, 2014

(51) Int. Cl.
| | |
|---|---|
| *B62K 21/18* | (2006.01) |
| *B62L 3/02* | (2006.01) |
| *B62K 19/32* | (2006.01) |
| *F16C 1/26* | (2006.01) |

(52) U.S. Cl.
CPC . *B62K 21/18* (2013.01); *B62L 3/02* (2013.01); *B62K 19/32* (2013.01); *F16C 1/26* (2013.01)

(58) Field of Classification Search
CPC ........ B62K 21/06; B62K 21/18; B62K 19/32; F16C 1/26; F16C 1/28
USPC ...................................... 280/279, 280, 281.1
See application file for complete search history.

(56) References Cited

U.S. PATENT DOCUMENTS

| | | | | |
|---|---|---|---|---|
| 6,302,589 | B1 * | 10/2001 | Van Houtte | 384/545 |
| 6,983,949 | B2 * | 1/2006 | Ueno et al. | 280/279 |
| 7,566,065 | B2 * | 7/2009 | Fukui | 280/281.1 |
| 2005/0057017 | A1 * | 3/2005 | Hara et al. | 280/279 |

* cited by examiner

*Primary Examiner* — Kevin Hurley
*Assistant Examiner* — Marlon Arce
(74) *Attorney, Agent, or Firm* — Patent Office of Bang Shia (57) ABSTRACT

A head parts assembly for a bicycle with a cable collecting device includes two bowl assemblies disposed at two ends of a front vertical pipe to collect brake cables, each of the bowl assemblies includes a bowl, a bearing disposed between the bowl and the front vertical pipe, and a cover for fixing the bearing inside the bowl. The bowl includes an assembling portion and an engaging portion tapering from the assembling portion, the engaging portion engages with the front frame pipe, the assembling portion is an annular structure and defines an opening, an annular rib is formed on an inner surface of the assembling portion, and the bearing is restricted in the opening. The assembling portion has plural penetrating holes penetrating the inner surface and an outer surface of the assembling portion, and the brake cables are inserted into the front frame pipe via the penetrating holes.

6 Claims, 7 Drawing Sheets

HEAD PARTS ASSEMBLY FOR A BICYCLE WITH A CABLE COLLECTING DEVICE

BACKGROUND OF THE INVENTION

1. Field of the Invention

The present invention relates to a head parts assembly for a bicycle, and more particularly to a head parts assembly for a bicycle with a cable collecting device.

2. Description of the Prior Art

Figure 1:
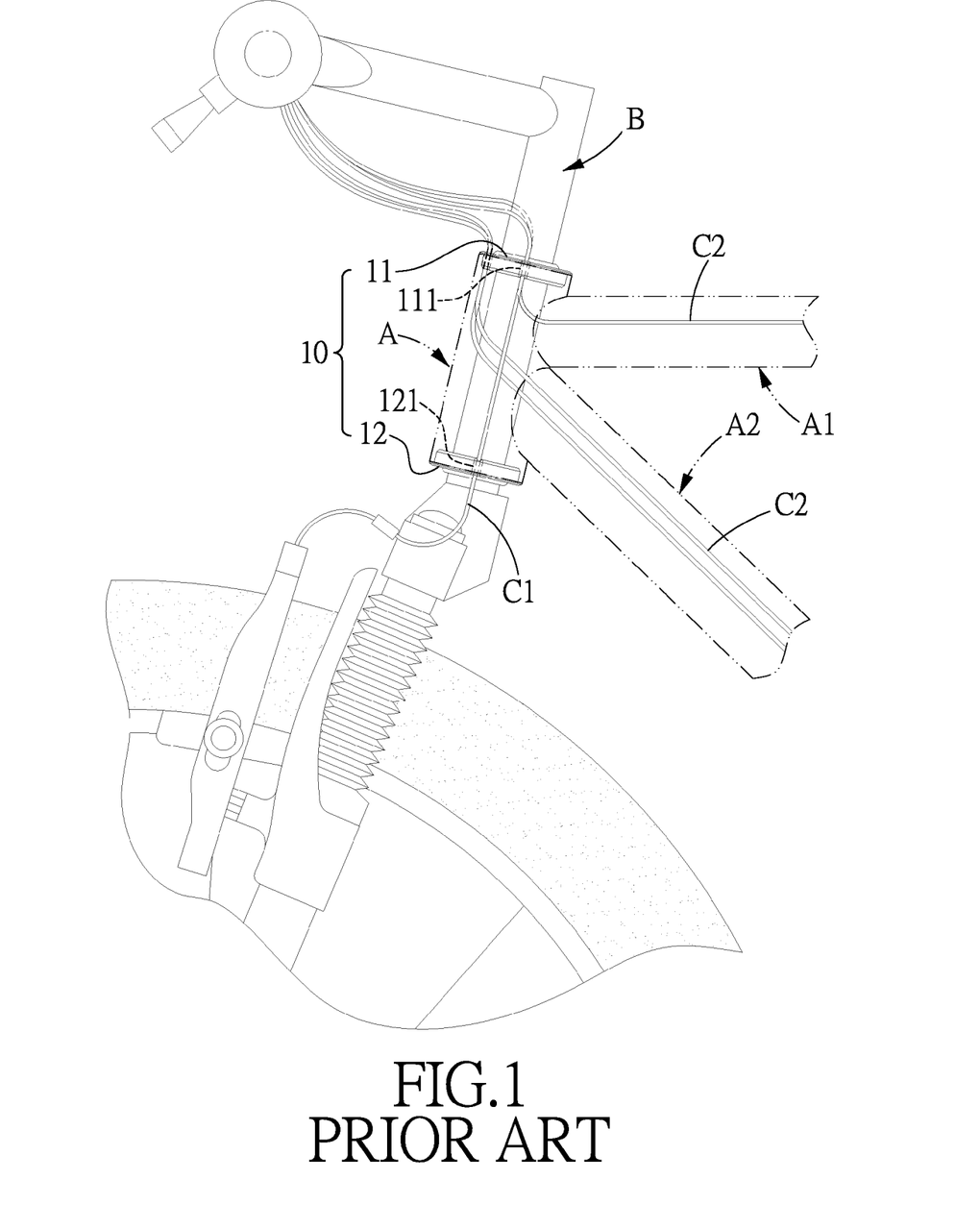
FIG. 1 shows a conventional bicycle head parts assembly.

As shown in FIG. 1, a conventional bicycle head parts assembly 10 is disposed at two ends of the front frame pipe A to allow for free rotation of the front vertical pipe B with respect to the front frame pipe A. Normally, the brake cables have one ends fixed to the handle bar of the bicycle, and are clamped by a cable-clamping device and then extend along the pipes of the bicycle frame to the front and rear wheels. However, the brake cables are collected at the top tube and the down tube, so the brake cables at the front frame pipe A look very messy, which not only affects the appearance of the bicycle, but also causes safety concerns since the messy brake cables are likely to hook something.

Figure 2:
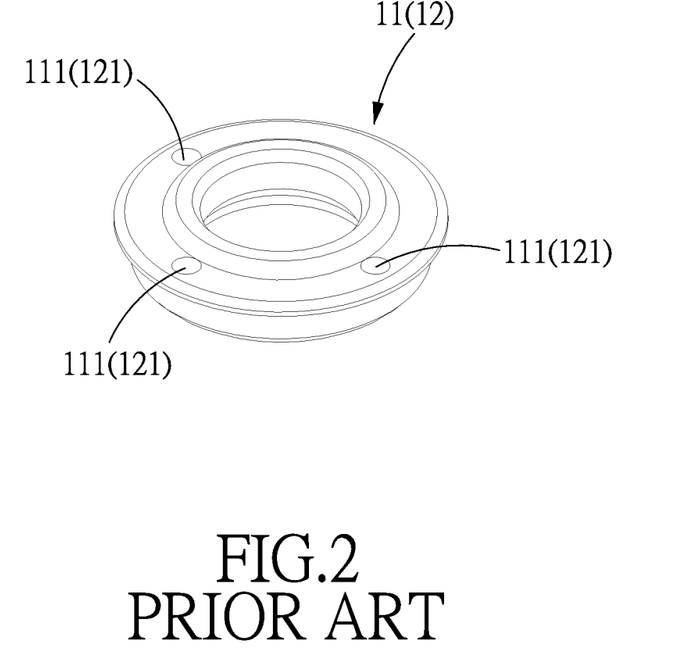
FIG. 2 shows the bowl of the conventional bicycle head parts assembly formed with holes.

To solve the above problem, the author of the present application has invented a "head parts assembly for a bicycle", as shown in FIGS. 1 and 2. The head parts assembly 10 comprises an upper bowl 11 and a lower bowl 12, each of which is formed with a plurality of holes 111, 121 extending in the axial direction of the front vertical pipe B. The front wheel brake cables C1 are inserted through the holes 111, 121 and therefore collected in the front frame pipe A. The front vertical pipe B extends to the front wheel brake mechanism. The rear wheel brake cables C2 are inserted through the holes 111 of the upper bowl 11 and into the front frame pipe A, and then run through the top tube A1 and the down tube A2 and finally extend to the rear wheel brake mechanism, so that the brake cables are disposed in a hidden manner to solve the abovementioned problems.

It is to be noted that the holes 111, 121 of the head parts assembly 10 provided for insertion of the brake cables are formed in the vertical direction, so that rain or other liquids are likely to flow through the holes into the front frame pipe A or even into the top tube A1 and the down tube A2, causing corrosion.

The present invention has arisen to mitigate and/or obviate the afore-described disadvantages.

SUMMARY OF THE INVENTION

The primary objective of the present invention is to provide a head parts assembly for a bicycle with a cable collecting device, wherein the penetrating holes are formed on the annular wall of the assembling portion of the bowl, which can prevent water or other liquid from flowing into the head parts assembly of the bicycle. Therefore, the head parts assembly for a bicycle with cables collecting device in accordance with the present invention is kind of waterproof. Besides, the brake cables are hidden in the pipe of the bicycle frame, which not only improves the aesthetic appearance of the bicycle, but also enhances riding safety.

To achieve the above objective, a head parts assembly for a bicycle with a cable collecting device in accordance with the present invention comprises two bowl assemblies disposed at two ends of a front frame pipe to collect brake cables, each of the bowl assemblies comprises a bowl, a bearing disposed between the bowl and the front vertical pipe, and a cover for fixing the bearing inside the bowl. The bowl includes an assembling portion and an engaging portion tapering from the assembling portion, the assembling portion and the engaging portion define an inner space, the engaging portion is provided for engaging with one end of the front frame pipe, the assembling portion is an annular structure and defines an opening, an annular rib is formed on an inner surface of the assembling portion, the bearing is restricted in the opening by the cover and fixed between the annular rib and the opening, the assembling portion is formed with a plurality of penetrating holes which penetrate the inner surface and an outer surface of the assembling portion and are located between the annular rib and the engaging portion, the brake cables are inserted into the front frame pipe via the penetrating holes.

Preferably, the bowl includes an axial direction and a radial direction perpendicular to the axial direction, the axial direction is a direction in which an axis of the bowl extends through a center of the opening, and the radial direction is a direction in which the radial lines of the opening extend, and the penetrating holes are formed in the assembling portion and do not extend in the radial direction, so that the two ends of each of the penetrating holes are arranged in a staggered manner, making it difficult for liquid to enter the bowl, improving the waterproof performance of the head parts assembly.

Preferably, each of the penetrating holes of the bowl is plugged with a waterproof plug which includes a plug portion to be inserted in the penetrating holes, a head portion formed at one end of the plug portion, and a passage running through the plug portion and the head portion, each of the waterproof plugs is deposed on the bowl in such a manner that the plug portion is inserted in a corresponding one of the penetrating holes and the head portion is abutted against the outer surface of the assembling portion, and the brake cables are inserted into the front frame pipe via the passage of the head portion of the waterproof plugs. The head portion of each of the waterproof plugs is provided with a recess, and the passage extends from the bottom of the recess to the plug portion.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Referring to FIGS. 3-8, a head parts assembly for a bicycle with cable collecting device in accordance with the present invention comprises two bowl assemblies D for enabling a front frame pipe A to be assembled to the front vertical pipe B, and for collecting the brake cables C. The two bowl assemblies D are disposed at two ends of the front frame pipe A, and each comprises a bowl 20, a bearing 30 disposed between the bowl 20 and the front vertical pipe B, and a cover 40 for fixing the bearing 30 inside the bowl 20.

Figure 3:
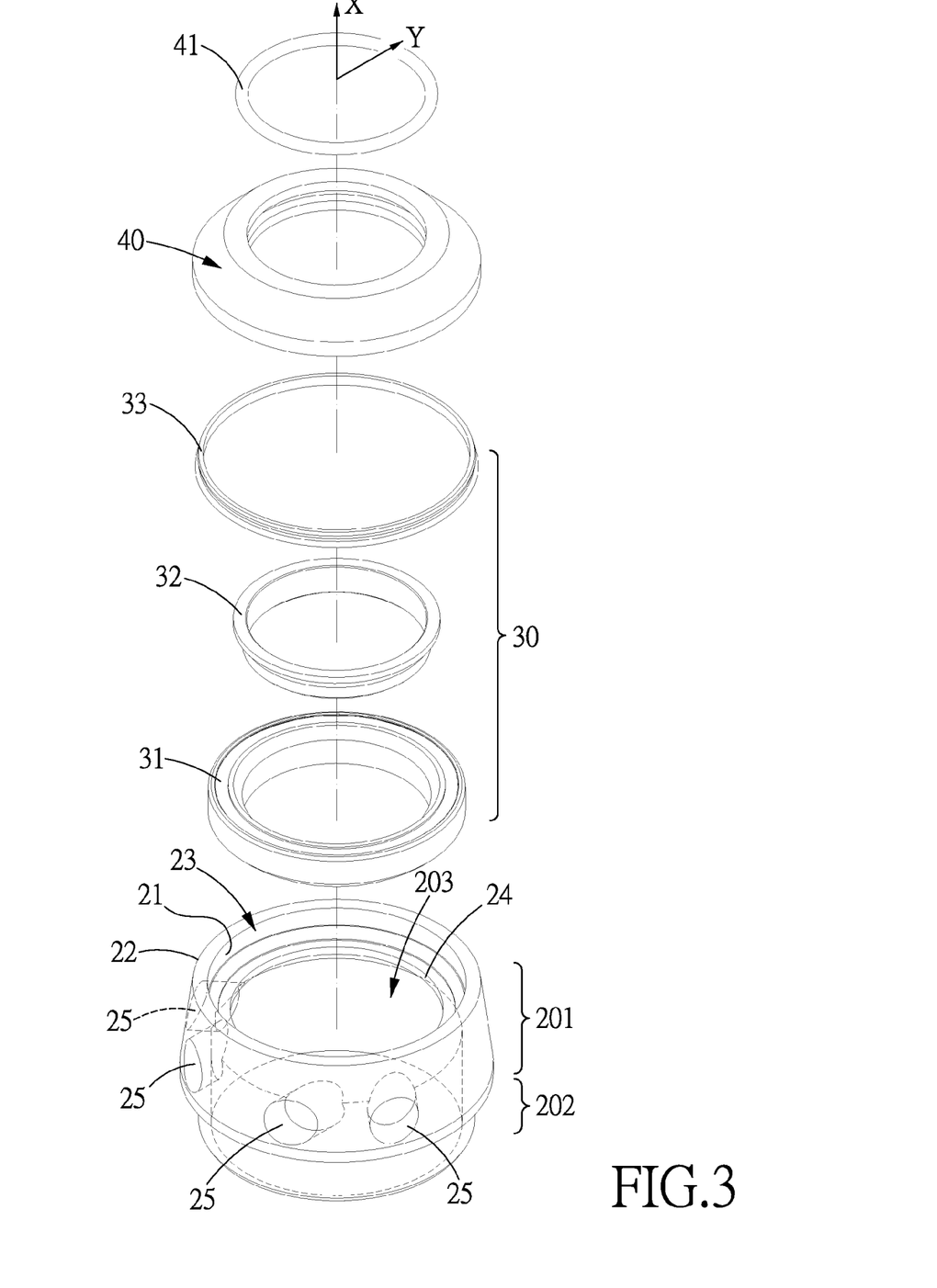
FIG. 3 is an exploded view of a head parts assembly for a bicycle with cable collecting device in accordance with the present invention.
Figure 4:
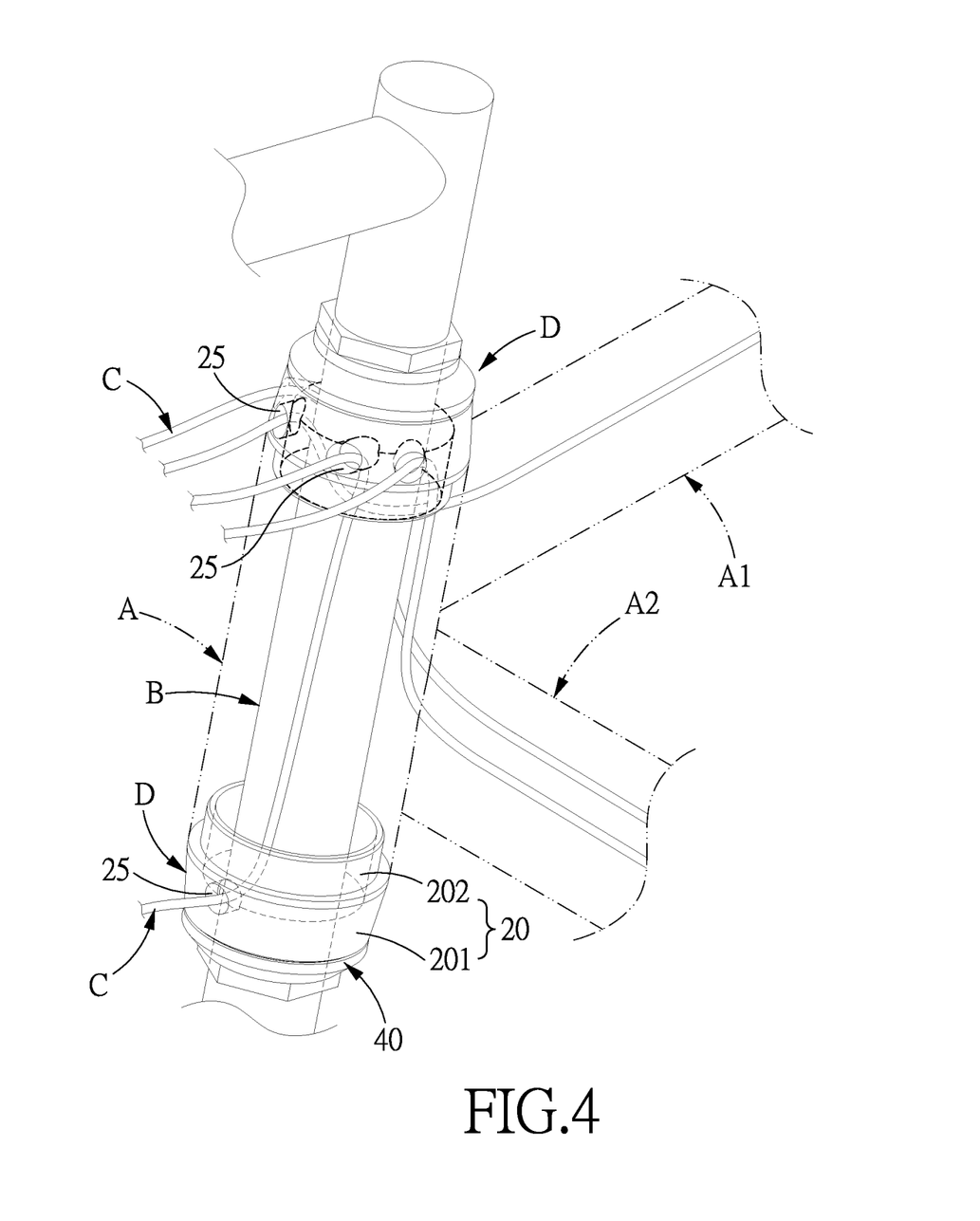
FIG. 4 is a perspective view showing that the head parts assembly with cable collecting device in accordance with the present invention is mounted on a bicycle.
Figure 5:
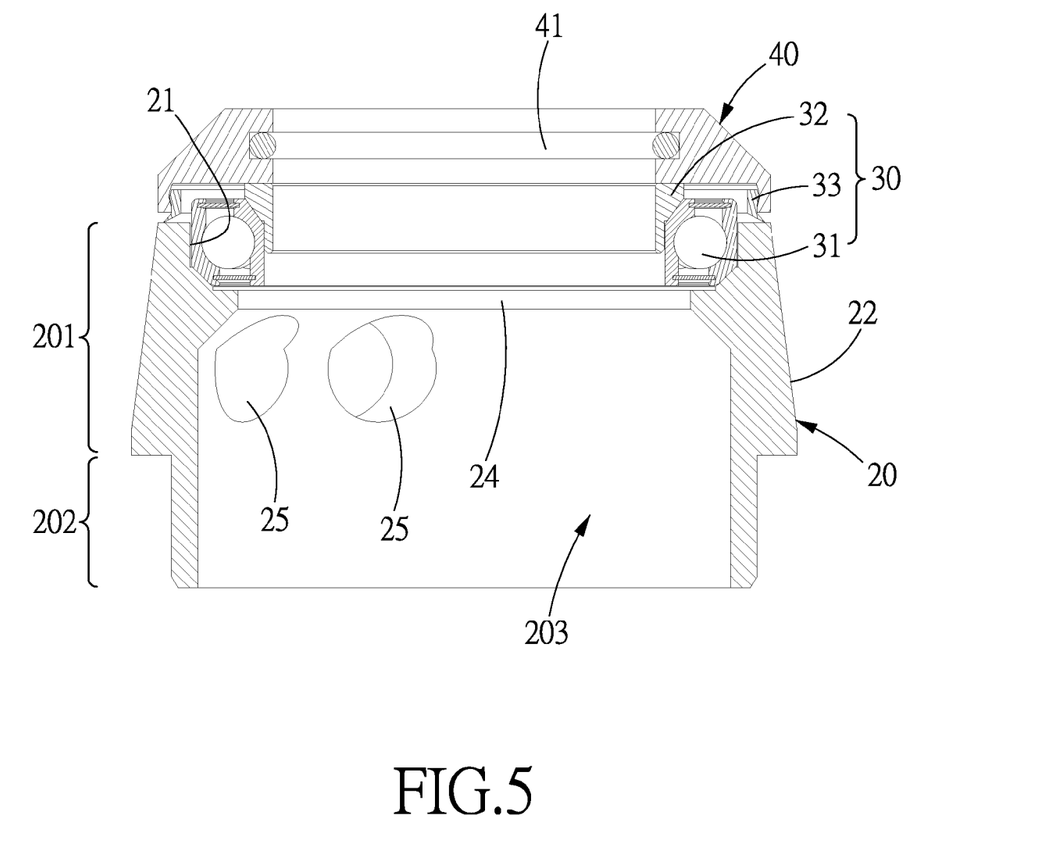
FIG. 5 is a cross sectional view of a bowl of the head parts assembly with cable collecting device in accordance with the present invention.

As shown in FIGS. 3-5, the bearing 30 includes a bearing body 31, an inserting member 32 and a restricting member 33. The bearing body 31 is disposed on an annular rib 24 which is formed at an assembling portion 201 of the bowl 20. The inserting member 32 and the restricting member 33 are then disposed on the bearing body 31. The cover 40 is screwed to the restricting member 33 to restrict the bearing 30 within the assembling portion 201 of the bowl 20. Between the cover 40 and the restricting member 33 is disposed a washer 41 as a waterproof and dustproof seal. The bearing 30 is sleeved onto the front vertical pipe B and disposed between the front vertical pipe B and the front frame pipe A.

The bowl 20, as shown in FIGS. 3 and 5, includes the assembling portion 201 and an engaging portion 202 tapering from the assembling portion 201. The assembling portion 201 and the engaging portion 202 define an inner space 203. The engaging portion 202 is provided for engaging with one end of the front frame pipe A. The assembling portion 201 is an annular structure and defines an opening 23. The annular rib 24 is formed on an inner surface of the assembling portion 201. The bearing 30 is restricted in the opening 23 by the cover 40 and fixed between the annular rib 24 and the opening 23. The assembling portion 201 is formed with a plurality of penetrating holes 25 which penetrate an inner surface 21 and an outer surface 22 of the assembling portion 201 and are located between the annular rib 24 and the engaging portion 202. The brake cables C can be inserted into the front frame pipe A via the penetrating holes 25, and arranging the penetrating holes 25 on the annular wall of the assembling portion 201 can prevent water or other liquid from flowing into the head parts assembly of the bicycle. Therefore, the head parts assembly for a bicycle with cables collecting device in accordance with the present invention is kind of waterproof.

Figure 8:
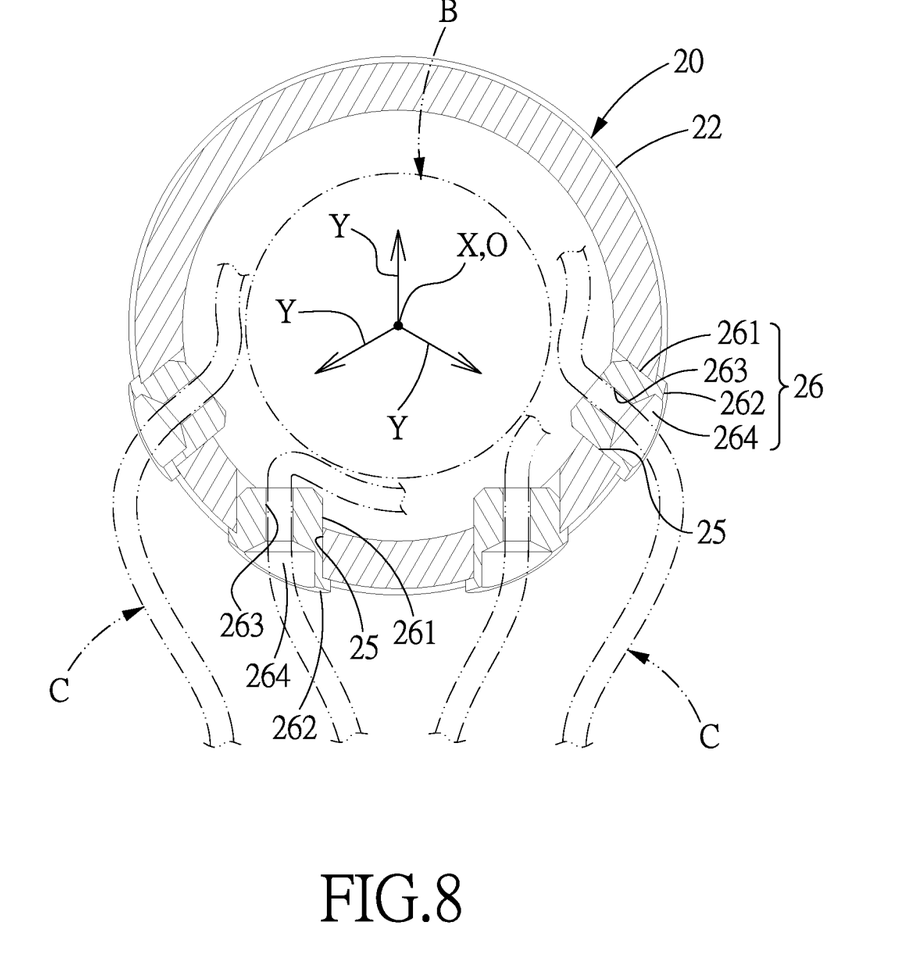
FIG. 8 is an illustrative view showing that the waterproof plugs are plugged in the bowl of the head parts assembly with cable collecting device in accordance with the present invention.

Referring to FIG. 3, the bowl 20 includes four penetrating holes 25, and the number of the penetrating holes 25 can be adjusted as desired. As shown in FIG. 8, the bowl 20 includes an axial direction X in which an axis of the bowl extends through a center O of the opening 23, and the bowl 20 further includes a radial direction Y in which the radial lines of the opening 23 extend, and the radial direction Y is perpendicular to the axial direction X. The penetrating holes 25 are formed in the assembling portion 201 and misaligned from the center of the opening 23, namely, the penetrating holes 25 do not extend in the radial direction Y, so that the two ends of each of the penetrating holes 25 are arranged in a staggered manner, making it difficult for liquid to enter the bowl 20, improving the waterproof performance of the head parts assembly.

Figure 6:
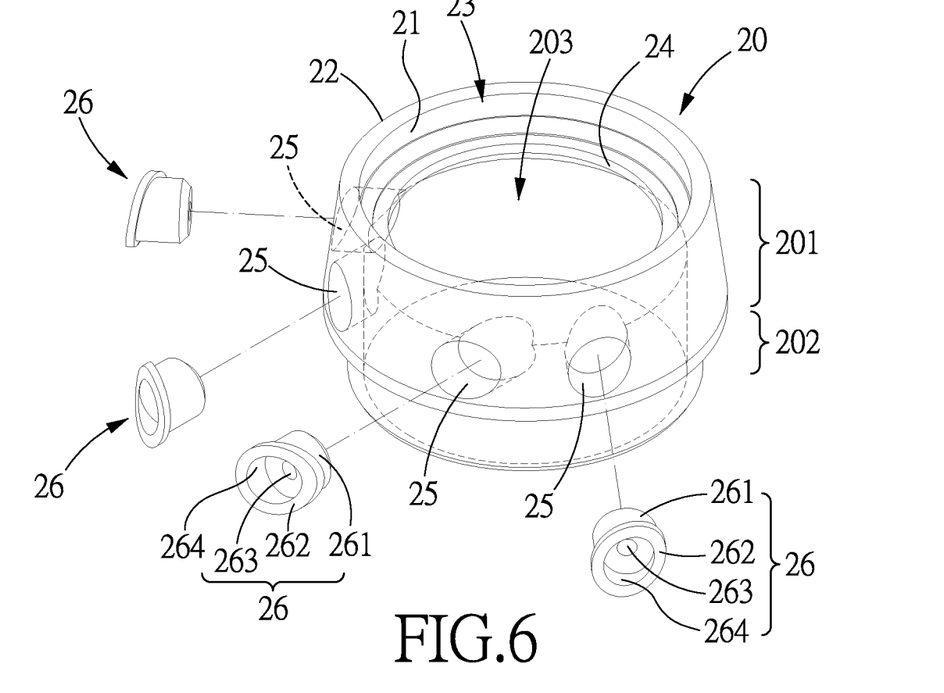
FIG. 6 is an exploded view showing the bowl and waterproof plugs of the head parts assembly with cable collecting device in accordance with the present invention.
Figure 7:
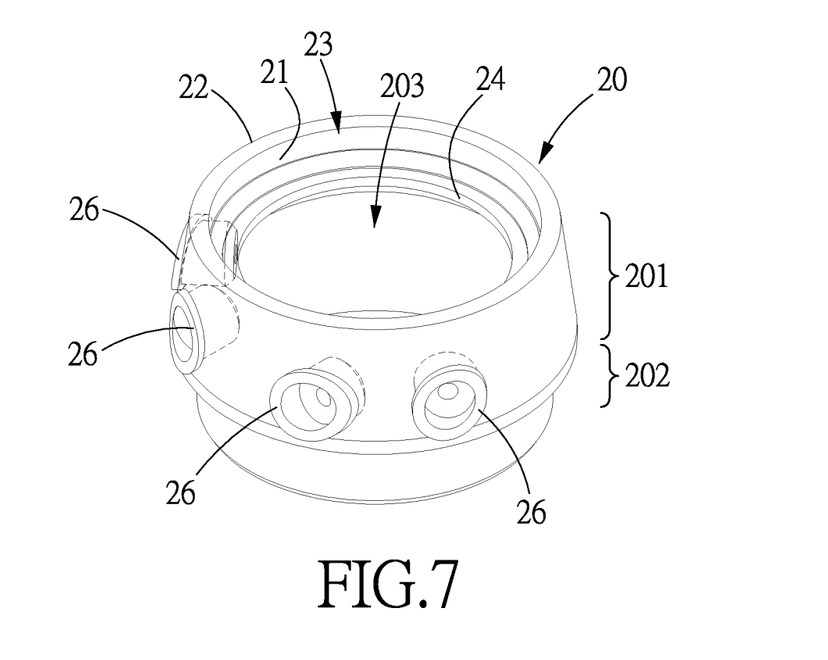
FIG. 7 shows that the waterproof plugs are plugged in the bowl of the head parts assembly with cable collecting device in accordance with the present invention.

Referring then to FIGS. 6-8, each of the penetrating holes 25 of the bowl 20 is plugged with a waterproof plug 26 which can be made of, but not limited to rubber. Each of the waterproof plugs 26 includes a plug portion 261 to be inserted in the penetrating holes 25, a head portion 262 formed at one end of the plug portion 261 and larger than the penetrating holes 25, and a passage 263 running through the plug portion 261 and the head portion 262. Each of the waterproof plugs 26 is deposed on the bowl 20 in such a manner that the plug portion 261 is inserted in a corresponding one of the penetrating holes 25 and the head portion 262 is abutted against the outer surface 22 of the assembling portion 201. The brake cables C are inserted into the front frame pipe A via the passage 263 of the head portion 262 of the waterproof plugs 26, then extend through the front frame pipe A and the upper and down tubes A1, A2, and are finally connected to the front and rear wheel brake mechanisms. In this embodiment, the head portion 262 of the waterproof plug 26 can further be provided with a recess 264, and the passage 263 extends from the bottom of the recess 264 to the plug portion 261. The recess 264 acts as a stop structure stopping liquid from entering the head parts assembly.

While we have shown and described various embodiments in accordance with the present invention, it is clear to those skilled in the art that further embodiments may be made without departing from the scope of the present invention.

What is claimed is:

1. A head parts assembly for a bicycle with a cable collecting device comprising two bowl assemblies disposed at two ends of a front frame pipe to collect brake cables, each of the bowl assemblies comprising a bowl, a bearing disposed between the bowl and a front vertical pipe, and a cover for fixing the bearing inside the bowl; characterized in that:
   the bowl includes an assembling portion and an engaging portion tapering from the assembling portion, the assembling portion and the engaging portion define an inner space, the engaging portion is provided for engaging with one end of the front frame pipe, the assembling portion is an annular structure and defines an opening, an annular rib is formed on an inner surface of the assembling portion, the bearing is restricted in the opening by the cover and fixed between the annular rib and the opening, the assembling portion is formed with a plurality of penetrating holes which penetrate the inner surface and an outer surface of the assembling portion and are located between the annular rib and the engaging portion, the brake cables are inserted into the front frame pipe via the penetrating holes.

2. The head parts assembly for the bicycle with the cable collecting device as claimed in claim 1, wherein the bowl includes an axial direction and a radial direction perpendicular to the axial direction, the axial direction is a direction in which an axis of the bowl extends through a center of the opening, and the radial direction is a direction in which the radial lines of the opening extend, and the penetrating holes are formed in the assembling portion and do not extend in the radial direction.

3. The head parts assembly for the bicycle with the cable collecting device as claimed in claim 1, wherein each of the penetrating holes of the bowl is plugged with a waterproof plug which includes a plug portion to be inserted in the penetrating holes, a head portion formed at one end of the plug portion, and a passage running through the plug portion and the head portion, each of the waterproof plugs is deposed on the bowl in such a manner that the plug portion is inserted in a corresponding one of the penetrating holes and the head portion is abutted against the outer surface of the assembling portion, and the brake cables are inserted into the front frame pipe via the passage of the head portion of the waterproof plugs.

4. The head parts assembly for the bicycle with the cable collecting device as claimed in claim 3, wherein the head portion of each of the waterproof plugs is provided with a recess, and the passage extends from the bottom of the recess to the plug portion.

5. The head parts assembly for the bicycle with the cable collecting device as claimed in claim 1, wherein the bearing includes a bearing body, an inserting member and a restricting member, the bearing body is disposed on the annular rib of the assembling portion of the bowl, the inserting member and the restricting member are then disposed on the bearing body, and the cover is screwed to the restricting member to restrict the bearing within the assembling portion of the bowl.

6. The head parts assembly for the bicycle with the cable collecting device as claimed in claim 2, wherein a washer is disposed between the cover and the restricting member.

\* \* \* \* \*